United States Patent
Lee et al.

(10) Patent No.: US 10,282,260 B2
(45) Date of Patent: May 7, 2019

(54) METHOD OF OPERATING STORAGE SYSTEM AND STORAGE CONTROLLER

(71) Applicant: SAMSUNG ELECTRONICS CO., LTD., Suwon-si, Gyeonggi-do (KR)

(72) Inventors: Ju-Pyung Lee, Incheon (KR); Chang-Man Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 273 days.

(21) Appl. No.: 15/183,435

(22) Filed: Jun. 15, 2016

(65) Prior Publication Data

US 2017/0024292 A1 Jan. 26, 2017

(30) Foreign Application Priority Data

Jul. 21, 2015 (KR) .......... 10-2015-0103035

(51) Int. Cl.
*G06F 11/14* (2006.01)
*G06F 11/16* (2006.01)
*G06F 11/00* (2006.01)
*G06F 12/02* (2006.01)

(52) U.S. Cl.
CPC .......... *G06F 11/1662* (2013.01); *G06F 11/00* (2013.01); *G06F 11/1435* (2013.01); *G06F 12/0292* (2013.01); *G06F 2201/805* (2013.01)

(58) Field of Classification Search
CPC .......... G06F 11/1662; G06F 11/1435
See application file for complete search history.

(56) References Cited

U.S. PATENT DOCUMENTS

| | | | |
|---|---|---|---|
| 5,644,696 A | 7/1997 | Pearson et al. | |
| 6,529,995 B1* | 3/2003 | Shepherd | G06F 11/1435 707/999.202 |
| 7,266,718 B2 | 9/2007 | Idei et al. | |
| 7,620,843 B2 | 11/2009 | Zohar et al. | |
| 7,689,599 B1 | 3/2010 | Shah et al. | |
| 8,219,777 B2 | 7/2012 | Jacobson et al. | |
| 8,285,952 B2 | 10/2012 | Arakawa et al. | |
| 8,463,798 B1 | 6/2013 | Claudatos et al. | |
| 8,689,040 B2 | 4/2014 | Kidney et al. | |
| 8,775,733 B2 | 7/2014 | Kawaguchi | |
| 8,892,941 B2 | 11/2014 | Dudgeon et al. | |
| 9,015,527 B2 | 4/2015 | Mohanta et al. | |
| 9,448,919 B1* | 9/2016 | Boyle | G06F 12/02 |
| 2002/0062422 A1* | 5/2002 | Butterworth | G06F 11/0727 711/114 |
| 2005/0015416 A1 | 1/2005 | Yamagami | |

(Continued)

*Primary Examiner* — Yolanda L Wilson
(74) *Attorney, Agent, or Firm* — Volentine, Whitt & Francos, PLLC

(57) ABSTRACT

The method of operating a storage system includes executing a storage service providing storage of a volume unit to at least one host device, in which the volume includes a first volume and a second volume. The method includes giving a first priority and a second priority lower than the first priority to the first volume and the second volume, respectively, and recovering meta-data for the first volume having the first priority when the storage service is stopped. The method includes starting the storage service using the recovered meta-data for the first volume, and recovering meta-data for the second volume having the second priority.

8 Claims, 17 Drawing Sheets

(56) References Cited

U.S. PATENT DOCUMENTS

| | | | |
|---|---|---|---|
| 2008/0178185 A1* | 7/2008 | Okada | G06F 11/1469 718/103 |
| 2011/0066803 A1* | 3/2011 | Arakawa | G06F 11/1088 711/114 |
| 2012/0117031 A1* | 5/2012 | Cha | G06F 11/00 707/674 |
| 2012/0233484 A1 | 9/2012 | Rossi | |
| 2013/0185532 A1 | 7/2013 | Flynn et al. | |
| 2014/0372710 A1* | 12/2014 | Bisht | G06F 11/1441 711/143 |

* cited by examiner

| STRIPE | 1003 | | | |
|---|---|---|---|---|
| OFFSET | 0 | 1 | 2 | 3 |
| VOLUME | 0 | 0 | 0 | 1 |
| LBA | 513 | 1025 | 1042 | 257 |

| STRIPE | 1007 | | | |
|---|---|---|---|---|
| OFFSET | 0 | 1 | 2 | 3 |
| VOLUME | 0 | 0 | 1 | 1 |
| LBA | 1012 | 1324 | 400 | 498 |

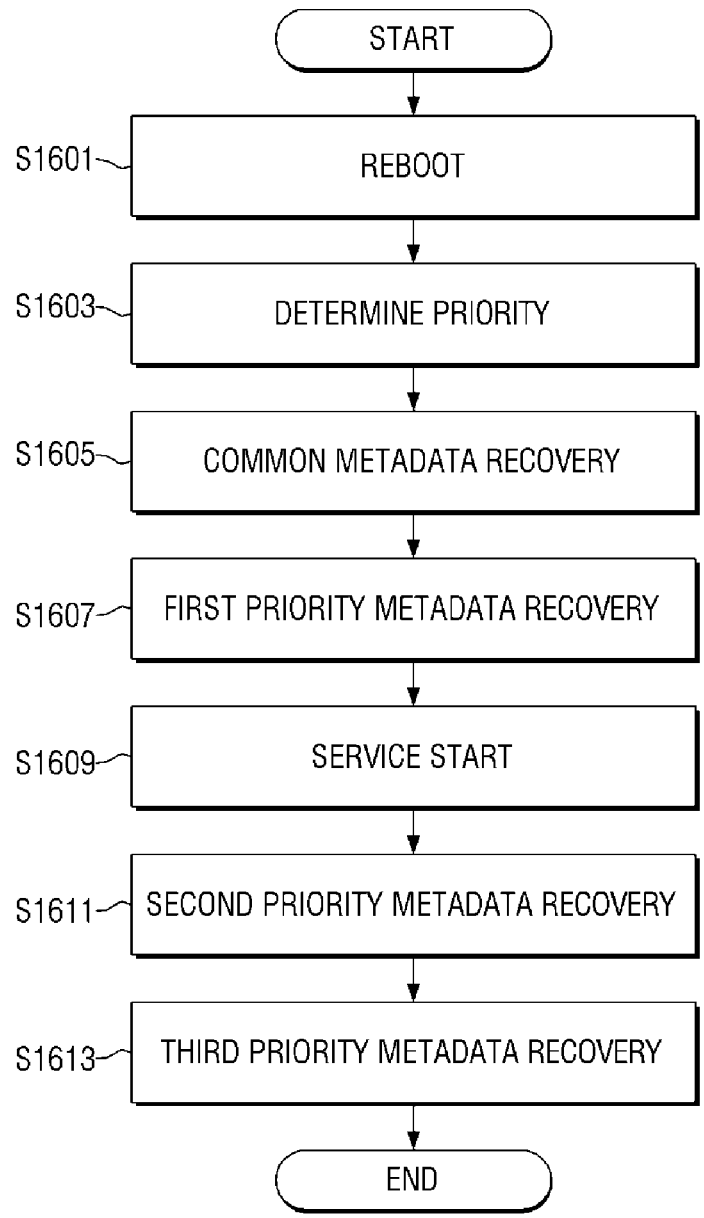

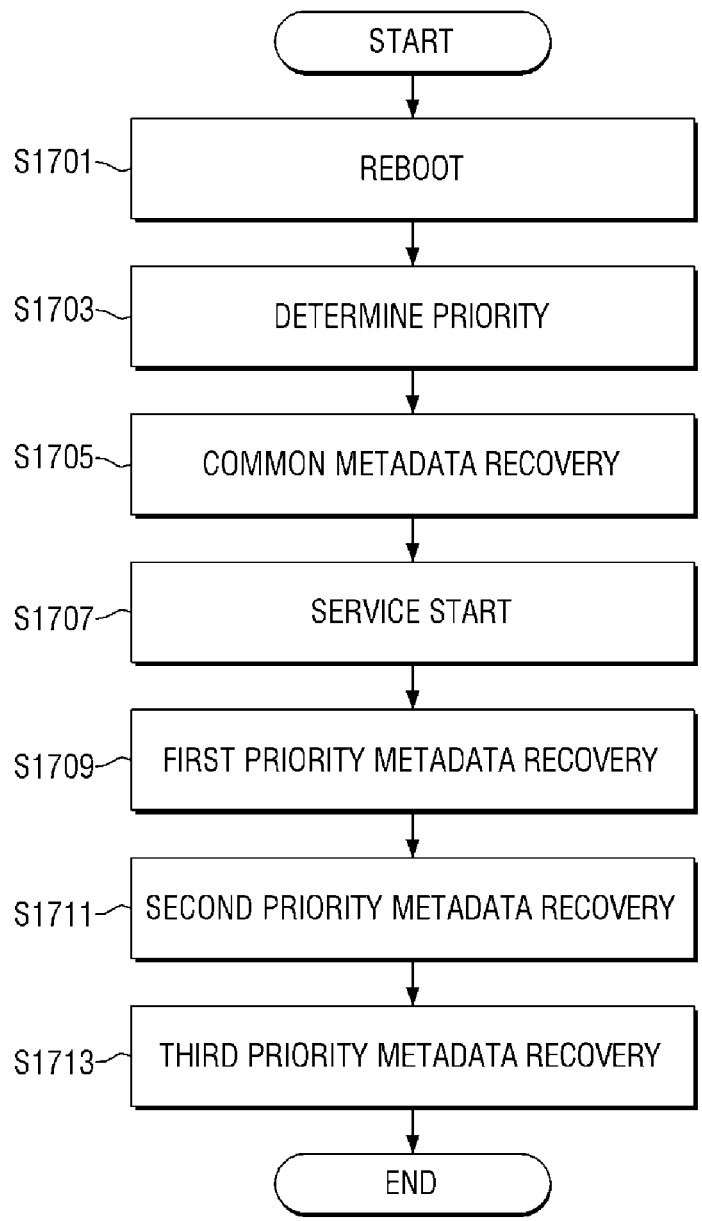

METHOD OF OPERATING STORAGE SYSTEM AND STORAGE CONTROLLER

This application claims priority from Korean Patent Application No. 10-2015-0103035, filed on Jul. 21, 2015, in the Korean Intellectual Property Office, the disclosure of which is incorporated herein by reference in its entirety.

BACKGROUND

1. Field of the Inventive Concept

The present inventive concept relates to a method of operating a data storage system and a storage controller.

2. Description of the Related Art

When sudden power off or system failure (system crash) occurs in a storage system, a storage service provided by the storage system is stopped. In this case, the storage system is rebooted to resume the stopped storage service, and recovers the meta-data necessary for providing the storage service. Further, if necessary, the storage system can also recover the data stored in the failed storage device (for example, disk drive).

SUMMARY

Aspects of the present inventive concept provide a method of operating a data storage system, by which a storage service may be quickly resumed by recovering meta-data by the priority for storage volume when the storage service is stopped.

Aspects of the present inventive concept also provide a storage controller which may quickly resume a storage service by recovering meta-data by the priority for storage volume when the storage service is stopped.

However, aspects of the present inventive concept are not restricted to those set forth herein. The above and other aspects of the present inventive concept will become more apparent to one of ordinary skill in the art to which the present inventive concept pertains by referencing the detailed description of the present inventive concept provided below.

According to an aspect of the present inventive concept, there is provided a method of operating a data storage system including executing a storage service providing storage of a volume unit to at least one host device, in which the volume includes a first volume and a second volume, giving or assigning a first priority and a second priority lower than the first priority to the first volume and the second volume, respectively, recovering meta-data for the first volume having the first priority when the storage service is stopped, starting the storage service using the recovered meta-data for the first volume, and recovering meta-data for the second volume having the second priority.

According to another aspect of the present inventive concept, there is provided a method of operating a data storage system including loading a volume mapping table including volume information provided to at least one host device in memory, in which the volume information includes volume information about a first volume having a first priority and volume information about a second volume having a second priority lower than the first priority, loading a first LBA mapping table in the memory, in which the first LBA mapping table serves to map a logical block address (LBA) for accessing the storage of the first volume having the first priority to at least one stripe defined in a storage device corresponding to the first volume, starting a storage service for the at least one host device using the first LBA mapping table loaded in memory, and loading a second LBA mapping table in the memory, in which the second LBA mapping table serves to map a logical block address (LBA) for accessing the storage of the second volume having the second priority to a physical address of a storage device corresponding to the second volume.

According to still another aspect of the present inventive concept, there is provided a storage device controller including a plurality of stripes and controlling a plurality of storage devices defining a first volume and a second volume provided to at least one host device, a priority manager giving a first priority to the first volume and giving a second priority lower than the first priority to the second volume; and a processor executing instructions for loading meta-data for the first volume having the first priority in memory when a storage service provided to the at least one host device is stopped, starting a storage service using the meta-data for the first volume loaded in the memory, and then loading meta-data for the second volume having the second priority in the memory.

BRIEF DESCRIPTION OF THE DRAWINGS

The above and other aspects and features of the present inventive concept will become more apparent by describing in detail exemplary embodiments thereof with reference to the attached drawings, in which:

FIGS. 3 to 8 are diagrams illustrating a method of operating a storage system according to an embodiment of the present inventive concept;

FIGS. 10 to 15 are diagrams illustrating a method of operating a storage system according to another embodiment of the present inventive concept;

FIG. 16 is a flowchart illustrating a method of operating a storage system according to an embodiment of the present inventive concept; and FIG. 17 is a flowchart illustrating a method of operating a storage system according to another embodiment of the present inventive concept.

DETAILED DESCRIPTION OF THE EMBODIMENTS

Figure 1:
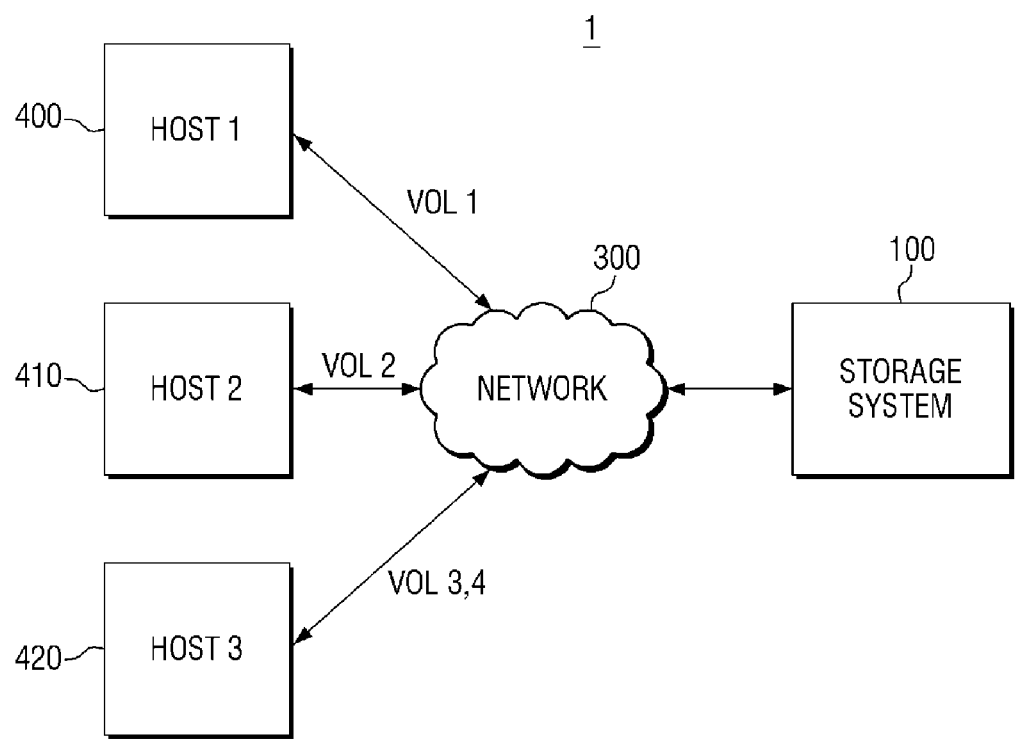
FIG. 1 is a schematic block diagram illustrating a storage service provided by a storage system according to an embodiment of the present inventive concept.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. In the drawings, the thickness of layers and regions are exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, preferred embodiments of the present inventive concept will be described in detail with reference to the attached drawings.

FIG. 1 is a schematic view illustrating a storage service provided by a storage system according to an embodiment of the present inventive concept.

Referring to FIG. 1, a storage system 100 according to an embodiment of the present inventive concept provides a storage service to one or more host devices 400, 410 and 420 through a network 300.

The storage system 100 provides storages to the host devices 400, 410 and 420. Specifically, the storage system 100 provides storages of a volume unit to the host devices 400, 410 and 420. For example, the storage system 100 may provide a storage of a first volume (VOL 1) of 300 GB to the host device 400, may provide a storage of a second volume (VOL 2) of 500 GB to the host device 410, and my provide a storage of a third volume (VOL 3) of 200 GB and a storage of a fourth volume (VOL 4) of 400 GB to the host device 420.

The storage system 100 keeps the volume information provided to the host devices 400, 410 and 420, and writes data to a storage device or reads data from the storage data using each of the volume information when the storage system 100 receives data access (for example, data write or data read) request from the host devices 400, 410 and 420.

The network 300 may include wired networks such as local area network (LAN) and wide area network (WAN) and wireless networks such as WiFi network and cellular network, but the present inventive concept is not limited thereto. In some embodiments of the present inventive concept, the network 300 may include storage area network (SAN). In some embodiments of the present inventive concept, the storage system 100 may be directly connected with the host devices 400, 410 and 420 by cables.

Examples of the host devices 400, 410 and 420 may include sever computers, personal computers, desktop computers, laptop computers, notebook computers, tablet computers, and various types of computing devices that is connected with the storage system 100 to transmit and receive data each other, but the present inventive concept is not limited thereto.

Figure 2:
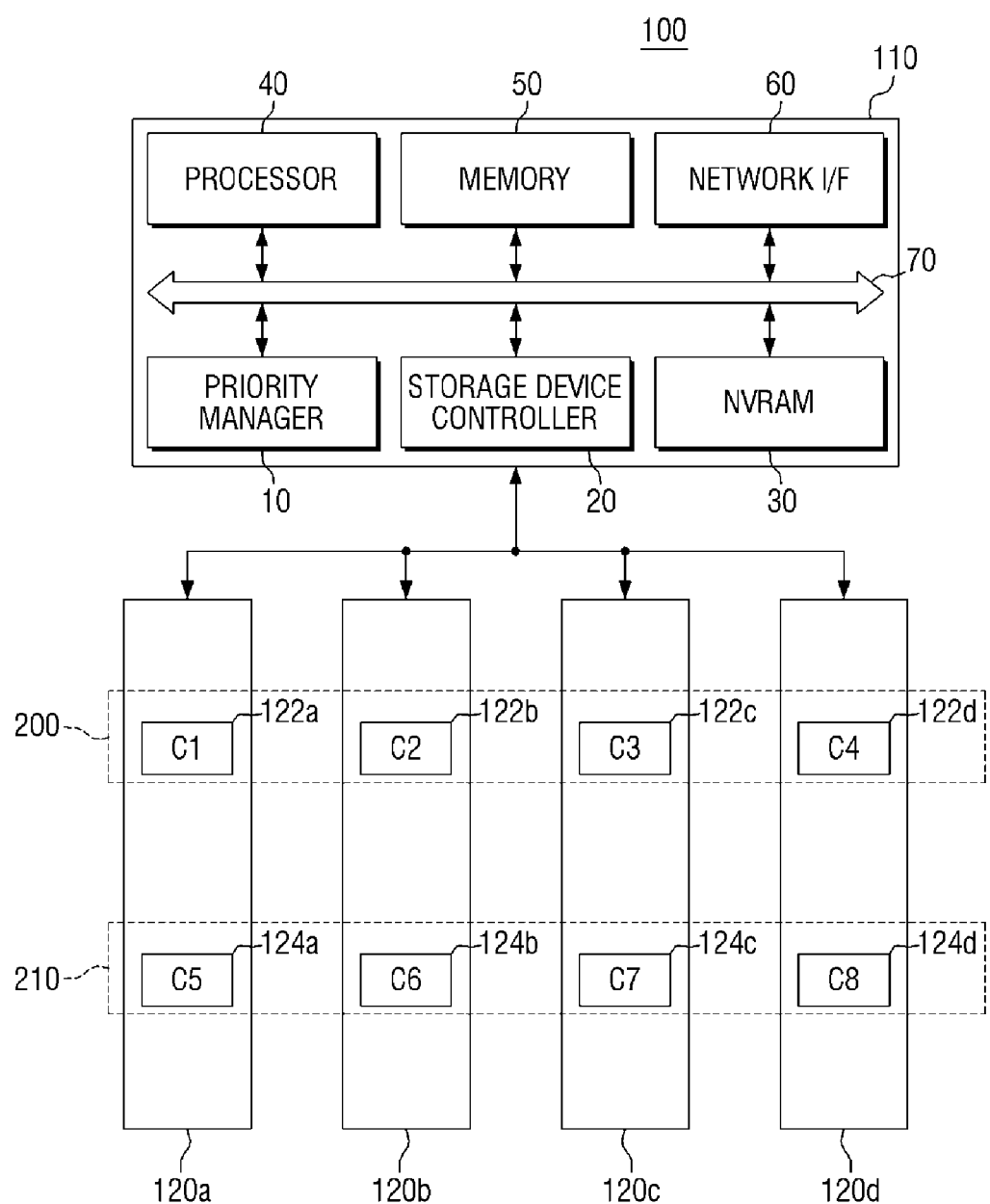
FIG. 2 is schematic diagram illustrating a storage system according to an embodiment of the present inventive concept.

FIG. 2 is schematic view illustrating a storage system according to an embodiment of the present inventive concept.

Referring to FIG. 2, the storage system 100 according to an embodiment of the present inventive concept includes a storage controller 110 and storage devices 120a, 120b, 120c and 120d.

The storage controller 110 processes the requests of the host devices 400, 410 and 420, provides the results thereof to the host devices 400, 410 and 420, and controls the storage devices 120a, 120b, 120c and 120d. The storage controller 110 includes a processor 40, memory 50, a network interface 60, a priority manager 10, a storage device controller 20, and non-volatile memory (NVRAM) 30. The processor 40, the memory 50, the network interface 60, the priority manager 10, the storage device controller 20, and the non-volatile memory (NVRAM) 30 can transmit and receive data each other through a bus 70.

First, explaining the storage device controller 20, the storage device controller 20 substantially controls the storage devices 120a, 120b, 120c and 120d in accordance with the program codes or instructions executed by the processor 40. For example, the storage device controller 20 may write data to the storage device 120a in accordance with a data write instruction or may read data from the storage device 120c in accordance with a data read instruction. The non-volatile memory 30 may include a variety of data including meta-data that is used to control the storage system 100 by the storage controller 110.

The processor 40 executes the program codes or instructions for controlling the storage system 100. The memory 50 may include these program codes or instructions. The memory may also include the meta-data that is used to control the storage system 100 by the storage controller 110. Meanwhile, the network interface 60 serves to allow the storage system 100 to transmit data to the host devices 400, 410 and 420 and receives the data therefrom through the network 300.

The meta-data that is used to control the storage system 100 may include a volume mapping table, an indirect mapping table, and an LBA mapping table, which will be described later in relation with FIG. 4. Further, the meta-data may also include information about stripes that are defined in the storage devices 120a, 120b, 120c and 120d. The storage controller 110 provides a storage service to the host devices 400, 410 and 420 using such meta-data. Such meta-data can be stored in a disk area including the storage devices 120a, 120b, 120c and 120d while the storage system 100 is not operated. For the storage controller 110 to use the meta-data, the meta-data stored in the disk area must be loaded to a memory area (for example, memory 50 or non-volatile memory 30).

If the storage service is stopped due to the occurrence of sudden power off or system failure (system crash), the storage controller 110 needs to recover the meta-data to control the storage system 100 and resume the storage service. That is, the storage controller 110 needs to load the meta-data stored in the disk area to the memory area (for example, memory 50 or non-volatile memory 30) to resume the storage service. In this case, recovering all the metadata at the same time requires considerable time and cost.

As described above with reference to FIG. 1, the storage system 100 provides storage of a volume unit to the host devices 400, 410 and 420. In this case, the priority manager 10 gives priority according to the volume provided to each of the host devices 400, 410 and 420. For example, the priority manager 10 may give the first priority, which is the highest priority, to the volume (VOL 2) provided to the host device 410, may give the second priority, which is lower than the first priority, to the volume (VOL 1) provided to the host device 400, and may give the third priority, which is lower than the second priority, to the volume (VOL 3) provided to the host device 420.

Accordingly, when the storage service is stopped, first, the storage controller 110 recovers the meta-data for the volume (VOL 2) having the first priority using the processor 40, and resumes the storage service using the recovered meta-data. In this case, the storage system 100 can provide the storage service to at least the host device 410 even before the storage service is completely recovered. Next, after the storage service is started, the storage controller 110 recovers the meta-data for the volume (VOL 1) having the second priority. In this case, the storage system 100 can provide the storage service to at least the host devices 410 and 400 even before the storage service is completely recovered. Thereafter, the storage controller 110 can recover the meta-data for the volume (VOL 3) having the third priority.

In some embodiments of the present inventive concept, the priority given to each volume may be determined by analyzing the characteristics of each volume, and may also be determined arbitrarily by an administrator. Here, the characteristics of each volume include the state of each volume, frequency or period of data access for each volume, importance of works performed using each volume, and cost value for each volume. That is, the priority given to each volume may be determined in consideration of these characteristics.

For example, the volumes connected with the host devices 400, 410 and 420 (that is, online volumes) may have a higher priority than the volumes disconnected with the host devices 400, 410 and 420 (that is, offline volumes). In the online volumes, the volume having a high data access frequency may have a higher priority than the volume having a low data access frequency. For another example, the volumes storing main executable files (for example, master volumes) may have a higher priority than the volumes storing data (for example, slave volumes), and the volumes having a high cost per unit capacity may have a higher priority than the volumes having a low cost per unit capacity. For still another example, an administrator may explicitly give a high priority for a specific volume.

Hereinafter, a process of allowing the storage controller 110 to recover meta-data when a storage service is stopped will be described in detail.

FIGS. 3 to 8 are views illustrating a method of operating a storage system according to an embodiment of the present inventive concept.

Referring to FIG. 3, to explain the method of operating a storage system according to an embodiment of the present inventive concept, it is assumed that the ID of a stripe 200 such as shown in FIG. 2 is "1003", and the data chunks 122a, 122b, 122c, and 122d included in the stripe 200 are identified by the offsets "0", "1", "2", and "3" respectively. Further, it is assumed that the data chunks 122a, 122b, and 122c identified by offsets "0", "1", and "2" are respectively accessed by the LBAs "513", "1025", and "1042", and are included in the first volume having a size of 500 GB. Meanwhile, it is assumed that the data chunk 122d identified by the offset "3" is accessed by the LBA "257", and is included in the second volume having a size of 300 GB.

Figure 4:
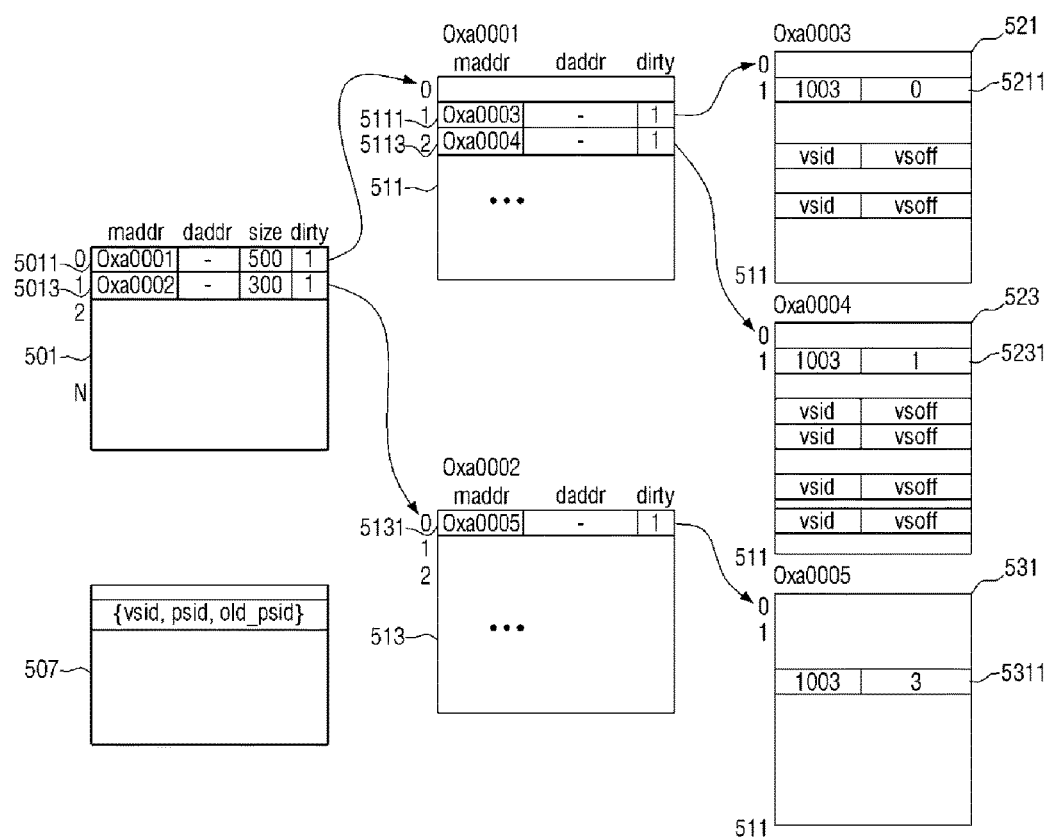

Under such assumptions, FIG. 4 shows the meta-data loaded in memory, that is, a volume mapping table 501, indirect mapping tables 511 and 513, and LBA mapping tables 521, 523, and 531.

The volume mapping table 501 includes the volume information provided to the host devices 400, 410, and 420. For example, the volume mapping table 501 includes a record 5011 including the volume information (for example, size of 500 GB) about the first volume and a record 5013 including the volume information (for example, size of 300 GB) about the second volume.

The indirect mapping tables 511 and 513 includes the information about the LBA mapping tables 521, 523, and 531 that are used according to the volumes. For example, the indirect mapping table 511 includes records 5111 and 5113 including the location information maddr about the LBA mapping tables 521 and 523 on the memory for accessing the storage of the first volume, and the indirect mapping table 513 includes a record 5131 including the location information maddr about the LBA mapping table 531 on the memory for accessing the storage of the second volume.

Each of the LBA mapping tables 521, 523, and 531 maps the logic block address (LBA) for accessing the storage of the corresponding volume to the stripe defined in the storage devices 120a, 120b, 120c, and 120d. For example, the data requested to be written in the LBA "513" for the first volume is stored in the offset No. "0" of the stripe "1003" in the storage devices 120a, 120b, 120c, and 120d, and the data requested to be written in the LBA "1025" for the first volume is stored in the offset No. "1" of the stripe "1003"

in the storage devices 120a, 120b, 120c, and 120d. Meanwhile, the data requested to be written in the LBA "257" for the second volume is stored in the offset No. "3" of the stripe "1003" in the storage devices 120a, 120b, 120c, and 120d.

Figure 5:
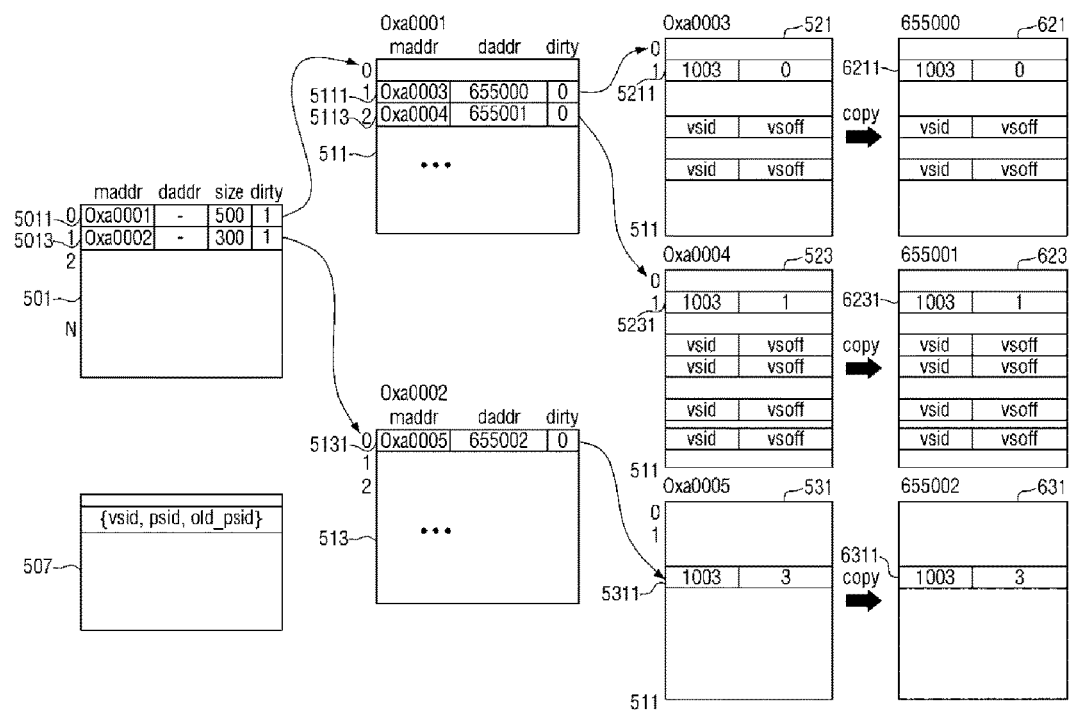
Figure 6:
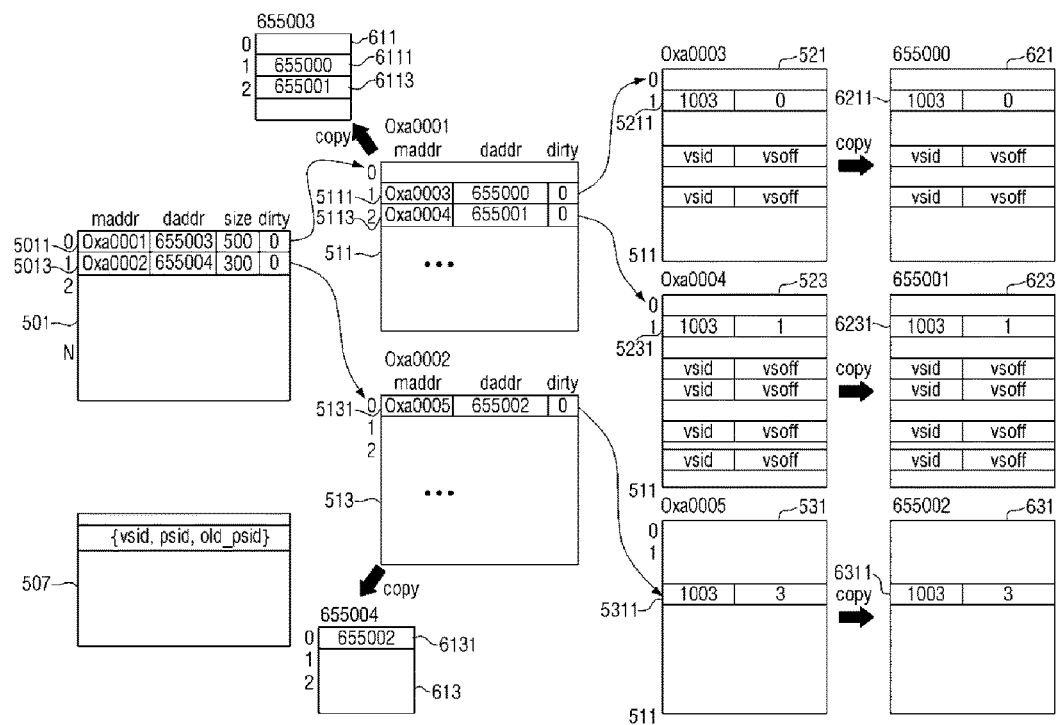
Figure 7:
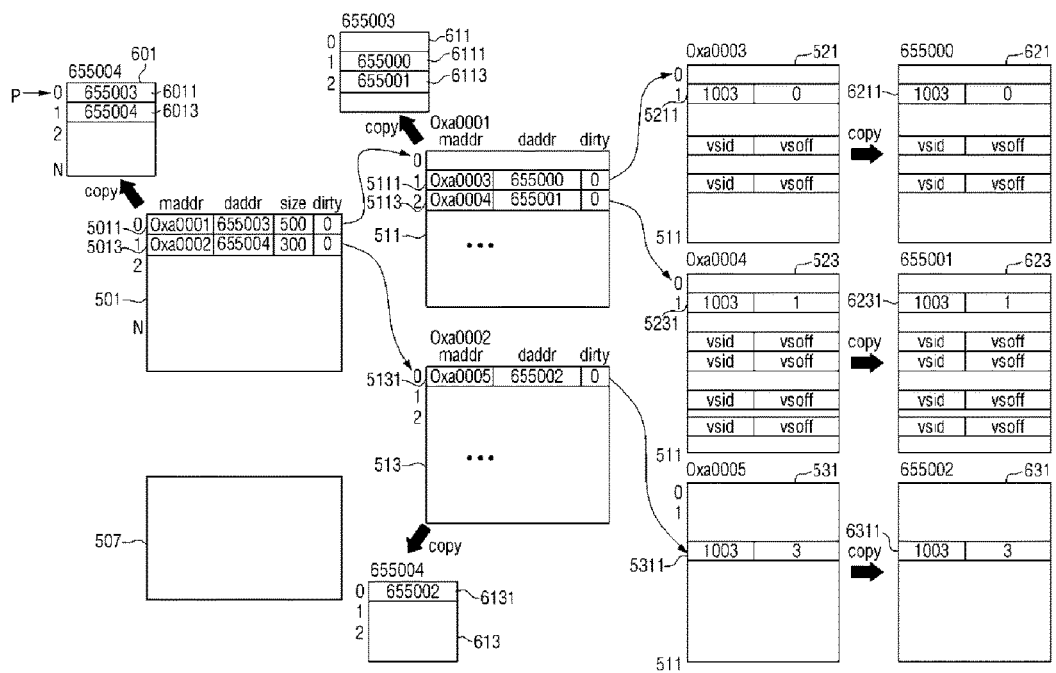

Subsequently, FIGS. 5 to 7 show a process of storing meta-data in a disk area. First, referring to FIG. 5, the LBA mapping tables 521, 523, and 531 on a memory area stored in a disk area as LBA mapping tables 621, 623, and 631. In this case, since the LBA mapping tables 521, 523, and 531 are flushed with the disk area, in the indirect mapping tables 511 and 513, the bit "dirty" is changed from 1 to 0, and the storage location thereof is recorded in the column "daddr". Next, referring to FIG. 6, the indirect mapping tables 511 and 513 on the memory area stored in the disk area as indirect mapping tables 611 and 613. In this case, since the indirect mapping tables 511 and 513 are flushed with the disk area, in the volume mapping table 501, the bit "dirty" is changed from 1 to 0, and the storage location thereof is recorded in the column "daddr". Finally, referring to FIG. 7, the volume mapping table 501 on the memory area also is stored in the disk area as a volume mapping table 601. The volume mapping table 601 stored in the disk area can be accessed by a pointer (P). Particularly, in this embodiment, it is assumed that the priority of the second volume given by the priority manager 10 is higher than that of the first volume.

Figure 8:
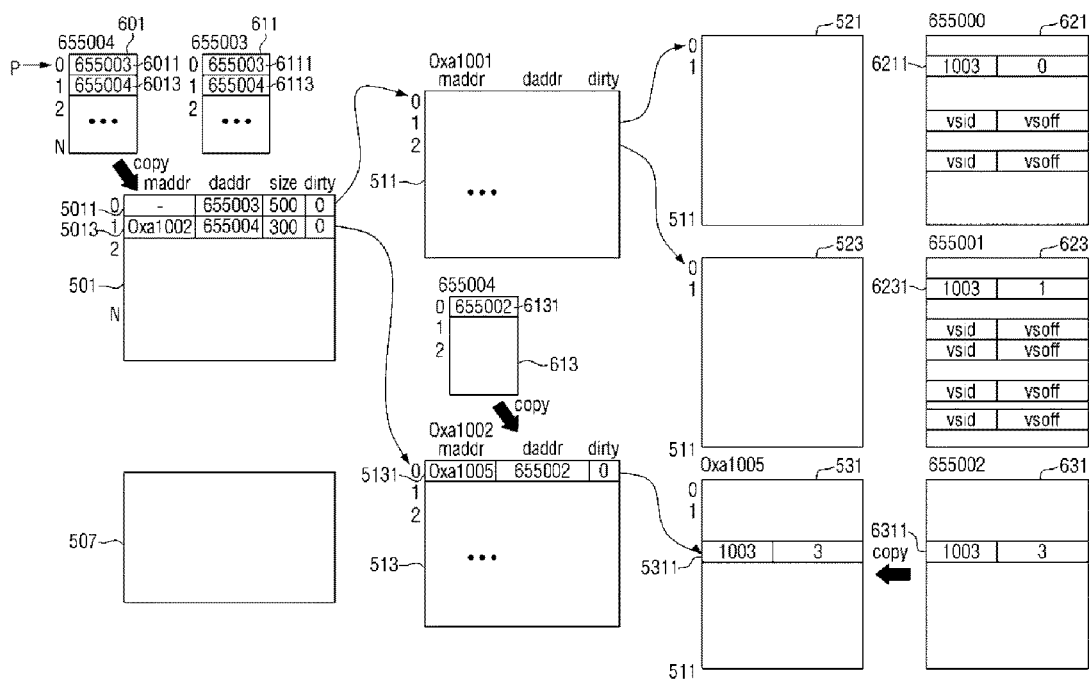

Next, referring to FIG. 8, when the storage service is stopped, the storage controller 110 recovers the meta-data for the second volume having a high priority. Specifically, the storage controller 110 reads the volume mapping table 601 stored in the disk area, and loads the volume mapping table 501 in the memory area. Then, the storage controller 110 loads the indirect mapping table 513 in the memory area using the location information about the indirect mapping table 613 on the disk area, the location information being recorded in the volume mapping table 501. Further, the storage controller 110 loads the LBA mapping table 531 in the memory area using the location information about the LBA mapping table 631 on the disk area, the location information being recorded in the indirect mapping table 513.

Then, the storage controller 110 starts a storage service using the recovered meta-data for the first volume (that is, the volume mapping table 501, indirect mapping table 513 and LBA mapping table 531 loaded in the memory area). Thereafter, the storage controller 110 recovers the meta-data for the first volume having a low priority. That is, the storage controller 110 additionally recovers the indirect mapping table 511 and the LBA mapping table 531, and loads these tables in the memory area.

As such, when the meta-data for the second volume having a high priority is first recovered and then the storage service is resumed using the recovered meta-data, the storage system 100 can provide storage services for some host devices even before the storage service is completely resumed.

Figure 9:
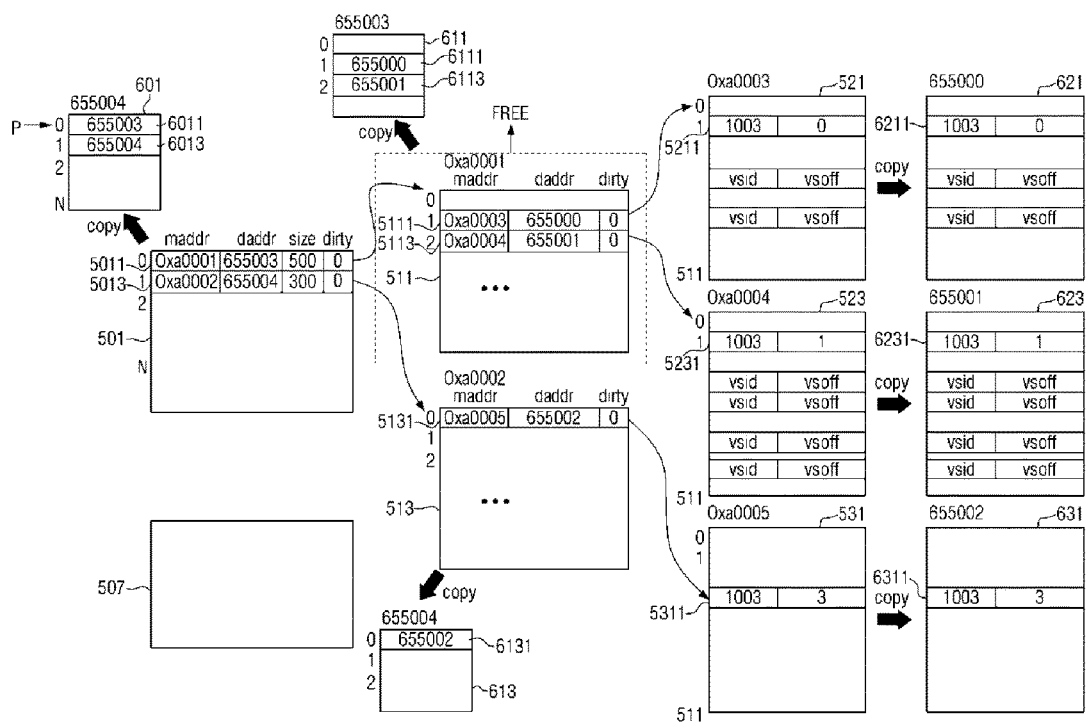
FIG. 9 is a diagram illustrating a method of operating a storage system according to another embodiment of the present inventive concept.

FIG. 9 is a view illustrating a method of operating a storage system according to another embodiment of the present inventive concept.

Referring to FIG. 9, in the method of operating a storage system according to another embodiment of the present inventive concept, the meta-data for a volume having a low priority can be freed from a memory before the meta-data for a volume having a high priority is freed.

For example, when the meta-data is required to be freed in the storage system 100, the indirect mapping table 511 for the first volume having a low priority can be freed before the indirect mapping table 513 for the second volume having a high priority is freed. Particularly, when a priority is determined by the frequency of data access to the corresponding volume, the meta-data for a volume having a low priority is freed before the meta-data for a volume having a high priority is freed, thereby reducing the frequency of the work for loading the meta-data from the disk area to the memory area again.

FIGS. 10 to 15 are views illustrating a method of operating a storage system according to another embodiment of the present inventive concept.

Referring to FIG. 10, to explain the method of operating a storage system according to another embodiment of the present inventive concept, it is assumed that the ID of a stripe 230 is "1007", and the data chunks 124a, 124b, 124c, and 124d included in the stripe 230 are identified by the offsets "0", "1", "2", and "3", respectively. Further, it is assumed that the data chunks 124a and 124b identified by offsets "0" and "1" are respectively accessed by the LBAs "1012" and "1324", and are included in the first volume having a size of 500 GB. Meanwhile, it is assumed that the data chunks 124c and 124d identified by the offset "2" and "3" is respectively accessed by the LBA "400" and "498", and is included in the second volume having a size of 300 GB.

Figure 11:
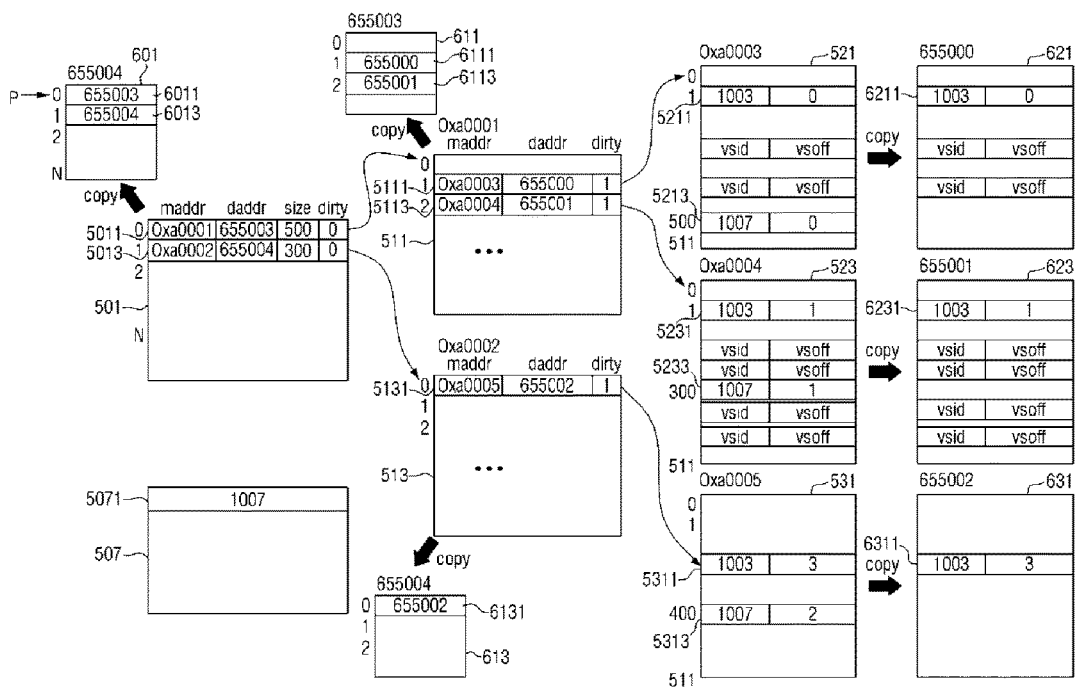

Under such assumptions, FIG. 11 shows the meta-data loaded in memory, that is, a volume mapping table 501, indirect mapping tables 511 and 513, and LBA mapping tables 521, 523, and 531. In this embodiment, the indirect mapping tables 511 and 513, and LBA mapping tables 521, 523, and 531 in the memory area may not be identical with the indirect mapping tables 611 and 613, and LBA mapping tables 621, 623, and 631 in the disk area in contents, because data is written in the stripe 230 shown in FIG. 10.

That is, the data requested to be written by the LBA "1012" for the first volume is stored in the offset No. "0" of the stripe "1007" in the storage devices 120a, 120b, 120c, and 120d, and the data requested to be written by the LBA "1324" for the first volume is stored in the offset No. "1" of the stripe "1007" in the storage devices 120a, 120b, 120c, and 120d. However, such information is reflected only in the LBA mapping tables 521 and 523 in the memory area, and is not reflected in the LBA mapping tables 621 and 623 in the disk area. Therefore, in the indirect mapping table 511, it is recorded in the column "dirty" that the LBA mapping tables 521 and 523 are not flushed with the disk area.

Meanwhile, the data requested to be written in the LBA "400" for the second volume is stored in the offset No. "2" of the stripe "1007" in the storage devices 120a, 120b, 120c, and 120d. However, such information is reflected only in the LBA mapping table 531, and is not reflected in the LBA mapping table 631 in the disk area. Therefore, in the indirect mapping table 513, it is recorded in the column "dirty" that the LAB mapping table 531 is not flushed with the disk area.

Figure 13:
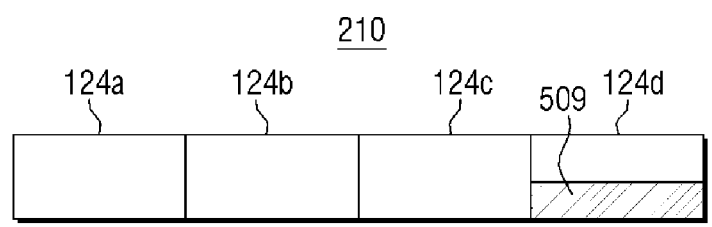

However, information about the additionally written stripe 210 is stored in a stripe journal 507, and, as shown in FIG. 13, a reverse map 509 for this information is stored n the storage devices 120a, 120b, 120c, and 120d.

Figure 12:
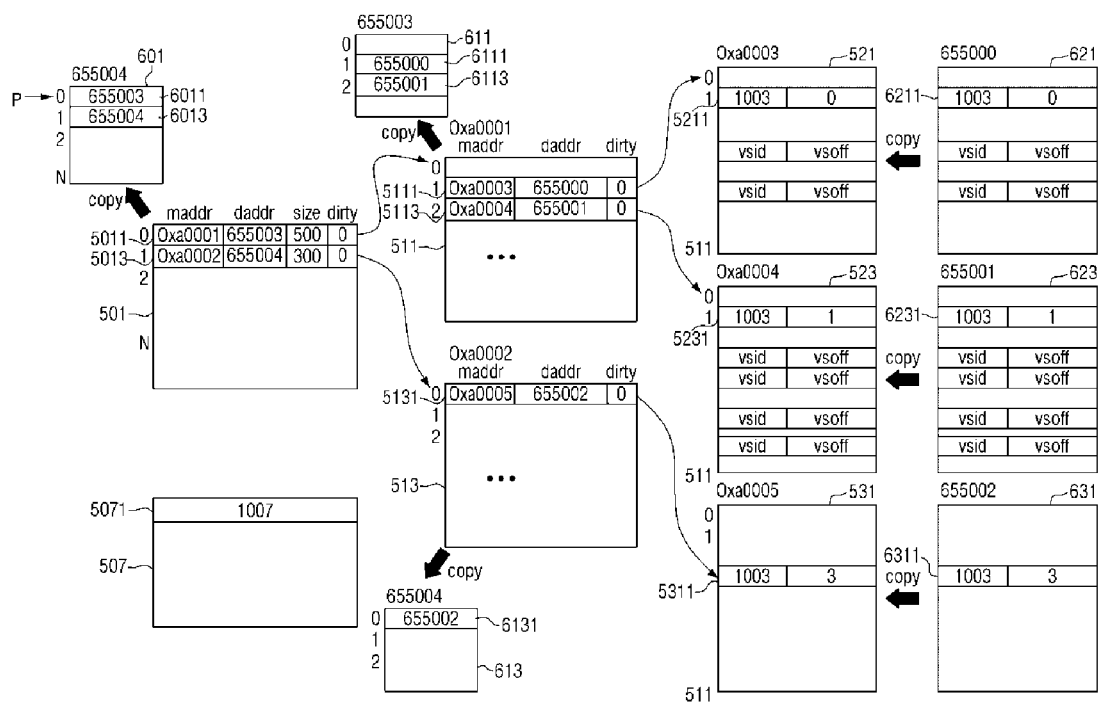

Subsequently, referring to FIG. 12, when the storage service is stopped under such circumstances, meta-data cannot be completely recovered only by the method described with reference to FIGS. 3 to 8. Therefore, the meta-data recovered using the reverse map 509 of FIG. 13 is required to be updated. Here, the reverse map 509 includes the volume information and LBA information stored in the corresponding stripe. In some embodiments of the present inventive concept, the reverse map 509 is stored in a part of the stripe (for example, a part of the data chunk 124d of the stripe 210).

Figure 14:
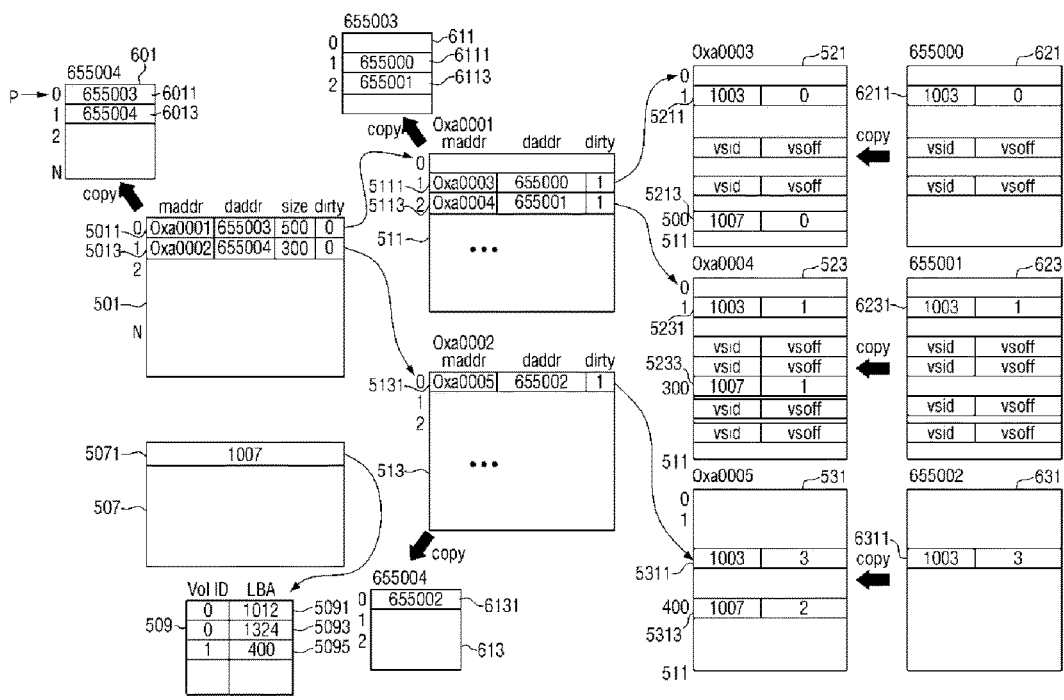

Referring to FIG. 14, the reverse map 509 for the stripe 210 includes information 5091 about the data chunk 124a corresponding to the first volume and having the LBA "1012", information 5093 about the data chunk 124b corresponding to the first volume and having the LBA "1324", and information 5095 corresponding to the second volume and having the LBA "400". Accordingly, the storage controller 110 can update the information about the data additionally written in the stripe 210 in the meta-data.

Particularly, in some embodiments of the present inventive concept, when the storage controller 110 receives a data write request for the second volume having a high priority from a host device, the storage controller 110 stores the data in the first stripe. Further, when the storage controller 110 receives a data write request for the first volume having a low priority from the host device, the storage controller 110 stores the data in the second stripe. When the data is written in this way, an operation for a stripe having a high priority can be first performed even when the meta-data is updated using the reverse map 509, and thus the stopped storage service can be provided more rapidly.

Figure 15:
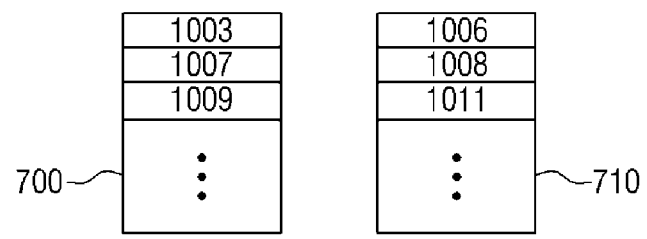

Referring to FIG. 15, in some embodiments of the present inventive concept, the stripe journal 507 includes a first region 700 and a second region 710. The first region 700 may include stripe information for a volume having a high priority (for example, information about stripes "1003", "1007", and "1009" corresponding to the second volume having a high priority). Meanwhile, the second region 710 may include stripe information for a volume having a low priority (for example, information about stripes "1006", "1008", and "1011" corresponding to the first volume having a low priority).

FIG. 16 is a flowchart illustrating a method of operating a storage system according to an embodiment of the present inventive concept.

Referring to FIG. 16, in the method of operating a storage system according to an embodiment of the present inventive concept, when sudden power off or system failure (system crash) occurs, the storage system 100 is rebooted (S1601), and then the priority manager 10 determines priority with respect to each volume (S1603). Thereafter, meta-data is recovered by the priority of volume.

First, common meta-data, which is meta data generally used in the storage system 100, is recovered (S1605), and then meta-data corresponding to the volume having a first priority is recovered (S1607). Then, a storage service starts using the recovered meta-data having the first priority (S1609). Thereafter, meta-data corresponding to the volume having a second priority lower than the first priority is recovered (S1611), and then meta-data corresponding to the volume having a third priority lower than the second priority is recovered (S1613).

FIG. 17 is a flowchart illustrating a method of operating a storage system according to another embodiment of the present inventive concept.

Referring to FIG. 17, in the method of operating a storage system according to another embodiment of the present inventive concept, when sudden power off or system failure (system crash) occurs, the storage system 100 is rebooted (S1701), and then the priority manager 10 determines priority with respect to each volume (S1703). Thereafter, meta-data is recovered by the priority of volume.

First, common meta-data, which is meta-data generally used in the storage system 100, is recovered (S1705), and then a storage service starts just using the recovered common meta-data (S1707). In this way, the stopped storage service can be resumed more rapidly.

Then, meta-data corresponding to the volume having a first priority is recovered (S1709). Thereafter, meta-data corresponding to the volume having a second priority lower than the first priority is recovered (S1711), and then meta-data corresponding to the volume having a third priority lower than the second priority is recovered (S1713).

Although the preferred embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A method of operating a data storage system, comprising:
   executing a storage service providing storage of at least a first volume and a second volume to at least one host device;
   assigning a first priority and a second priority lower than the first priority to the first volume and the second volume, respectively;
   recovering meta-data for the first volume having the first priority when the storage service is stopped;
   starting the storage service using the recovered meta-data for the first volume; and
   recovering meta-data for the second volume having the second priority,
   wherein said recovering the meta-data for the first volume includes loading a first logical block address (LBA) mapping table in memory, in which the first LBA mapping table serves to map an LBA for accessing the storage of the first volume to at least one stripe defined in a storage device corresponding to the first volume.

2. The method of claim 1, wherein said recovering the meta-data for the second volume includes loading a second LBA mapping table in the memory, in which the second LBA mapping table serves to map an LBA for accessing the storage of the second volume to at least one stripe defined in a storage device corresponding to the second volume.

3. The method of claim 1, wherein said recovering the meta-data for the first volume includes recovering common meta-data for the storage service and then recovering meta-data for the first volume, and
   wherein starting the storage service includes starting the storage service using the recovered common meta-data.

4. A method of operating a data storage system, comprising:
   executing a storage service providing storage of at least a first volume and a second volume to at least one host device;
   assigning a first priority and a second priority lower than the first priority to the first volume and the second volume, respectively;
   recovering meta-data for the first volume having the first priority when the storage service is stopped;
   starting the storage service using the recovered meta-data for the first volume; and
   recovering meta-data for the second volume having the second priority,
   wherein the meta-data for the second volume having the second priority is freed from a memory before the meta-data for the first volume having the first priority is freed.

5. A method of operating a data storage system, comprising:
- executing a storage service providing storage of at least a first volume and a second volume to at least one host device;
- assigning a first priority and a second priority lower than the first priority to the first volume and the second volume, respectively;
- recovering meta-data for the first volume having the first priority when the storage service is stopped;
- starting the storage service using the recovered meta-data for the first volume; and
- recovering meta-data for the second volume having the second priority,
- wherein said recovering the meta-data for the first volume includes updating the meta-data for the first volume using a first reverse map stored in a first stripe defined in a storage device corresponding to the first volume, and
- wherein said recovering the meta-data for the second volume includes updating the meta-data for the second volume using a second reverse map stored in a second stripe defined in a storage device corresponding to the second volume.

6. The method of claim 5, wherein each of the first stripe and the second stripe includes a plurality of data chunks, data chunks from among the plurality of data chunks included in the first stripe correspond to the first volume having the first priority, and data chunks from among the plurality of data chunks included in the second stripe correspond to the second volume having the second priority.

7. The method of claim 5, further comprising:
- storing data in the first stripe responsive to receiving a data write request for the first volume from the at least one host device; and
- storing data in the second stripe responsive to receiving a data write request for the second volume from the at least one host device.

8. The method of claim 5, further comprising:
- storing stripe information about the first volume having the first priority in a first region of a non-volatile memory (NVRAM); and
- storing stripe information about the second volume having the second priority in a second region of the non-volatile memory (NVRAM).

* * * * *